United States Patent
Gill et al.

(10) Patent No.: US 9,597,780 B2
(45) Date of Patent: Mar. 21, 2017

(54) CLAMP HEAD

(71) Applicant: EV IP LP, Dover, DE (US)

(72) Inventors: Neil Frank Gill, Bradford (GB); Louise Foster, Bradford (GB); Terence Williams, Bradford (GB); Douglas Ramsay Norris, Bradford (GB)

(73) Assignee: EV IP LP, Dover, DE (US)

( * ) Notice: Subject to any disclaimer, the term of this patent is extended or adjusted under 35 U.S.C. 154(b) by 105 days.

(21) Appl. No.: 14/432,582

(22) PCT Filed: Oct. 1, 2012

(86) PCT No.: PCT/IB2012/001925
§ 371 (c)(1),
(2) Date: Mar. 31, 2015

(87) PCT Pub. No.: WO2014/053868
PCT Pub. Date: Apr. 10, 2014

(65) Prior Publication Data
US 2015/0266165 A1    Sep. 24, 2015

(51) Int. Cl.
*B25B 5/16* (2006.01)
*B25B 5/10* (2006.01)
(Continued)

(52) U.S. Cl.
CPC .............. *B25B 5/163* (2013.01); *B25B 5/105* (2013.01); *F16B 2/065* (2013.01); *B25B 5/08* (2013.01);
(Continued)

(58) Field of Classification Search
CPC  B25B 5/105; B25B 5/163; B25B 5/08; B25B 5/10; B25B 5/106; B16B 2/065;
(Continued)

(56) References Cited

U.S. PATENT DOCUMENTS 1,346,504 A * 7/1920 Mathison ................ B25B 5/105
144/278.1
2,175,453 A * 10/1939 Barcy .................... E04B 1/2612
238/338
(Continued)

FOREIGN PATENT DOCUMENTS

DE       2816295    * 10/1979
DE       2816295 A1   10/1979
(Continued)

OTHER PUBLICATIONS

Features of High Strength Tension Control (TC) Bolts; Feb. 5, 2005; TCB (Torsion Control Bolts).*
(Continued)

*Primary Examiner* — Larry E Waggle, Jr.
*Assistant Examiner* — Mahdi H Nejad
(74) *Attorney, Agent, or Firm* — Douglas Denninger (57) ABSTRACT

A clamp head including an arched body having upper and lower faces, and opposing unequal length arms. The body further has a through aperture for a bolt or like threaded fastener extending between the upper and lower faces, the through aperture tapering outwardly through the body in the direction of the lower face. The arms comprise a reaction arm having at its distal end a curved reaction face and a clamping arm having at its distal end a curved clamping face. The curved reaction face has a first edge that is proximal to the reaction face and a second edge that is distal to the reaction face, wherein the radius of curvature of the reaction face increases in the direction of the second edge.

18 Claims, 9 Drawing Sheets

(51) Int. Cl.
*F16B 2/06* (2006.01)
*B25B 5/08* (2006.01)
*F16B 43/02* (2006.01)

(52) U.S. Cl.
CPC ............. *B25B 5/106* (2013.01); *F16B 43/025* (2013.01); *Y10T 403/335* (2015.01); *Y10T 403/4674* (2015.01)

(58) Field of Classification Search
CPC .......... F16B 43/025; F16B 2/10; F16B 2/005; F16B 2/065; Y10T 403/335; Y10T 292/0866
USPC .......................... 269/94, 134, 93, 258; D8/72
See application file for complete search history.

(56) References Cited

U.S. PATENT DOCUMENTS

| | | | | |
|---|---|---|---|---|
| 2,210,249 A | * | 8/1940 | Lindsay | E01B 9/28 238/375 |
| 2,365,079 A | * | 12/1944 | Huber | B25B 5/106 269/165 |
| 3,210,069 A | * | 10/1965 | Holtz | B25B 5/105 269/238 |
| D322,259 S | * | 12/1991 | Quandt | D15/135 |
| 5,451,116 A | * | 9/1995 | Czachor | F01D 9/065 403/28 |
| 7,021,855 B2 | * | 4/2006 | Hardtke | F16B 2/065 403/168 |
| D597,393 S | * | 8/2009 | Klippel | D8/72 |
| 8,459,624 B2 | * | 6/2013 | Klippel | B25B 5/105 238/349 |
| D762,436 S | * | 8/2016 | Gill | D8/72 |
| 2002/0088868 A1 | * | 7/2002 | Kirchner | F16B 2/065 238/310 |
| 2009/0051093 A1 | * | 2/2009 | Klippel | B25B 5/105 269/216 |

FOREIGN PATENT DOCUMENTS

| | | | |
|---|---|---|---|
| DE | 2626808 | * | 4/1987 |
| EP | 0431209 | * | 12/1989 |
| EP | 0431209 A1 | | 12/1989 |
| EP | 0431209 | * | 7/1994 |
| EP | 1946891 | * | 1/2008 |
| EP | 1946891 A1 | | 1/2008 |
| GB | 629096 A | | 9/1949 |
| GB | 1530463 | * | 6/1975 |
| GB | 1530463 | * | 11/1978 |
| WO | PCT/IB2012/001925 | | 4/2015 |

OTHER PUBLICATIONS

Features of High Strength Tension Control (TC) Bolts, XP-002688987, http://web.archive.org/web/20020606115545/ http://www.tcbolts.co.uk/tcb-1.htm, Jun. 3, 2002.

* cited by examiner

CLAMP HEAD

CROSS REFERENCE TO RELATED APPLICATIONS

This application is national phase filing under 35 USC §371 of international application No. PCT/IB2012/001925 EP2013/058910 filed 1 Oct. 2012.The entire contents of the above-mentioned application is incorporated herein by reference.

FIELD OF THE INVENTION

The present invention relates to a clamp head and particularly to a clamp head suitable for incorporation in a clamp for structural steelwork.

BACKGROUND OF THE INVENTION

Clamp arrangements including a nut and bolt, and at least one shaped clamp head are utilised to attach items to a structural steelwork element, or to connect two structural steel work elements to one another. Typically, the distance from an engagement surface of the clamp head to a reference plane must be measured or calculated, and the size of the clamp head chosen must be able to accommodate the desired distance. Failure to correctly calculate or measure the distance, or to ignore this requirement in its entirety, can lead to the use of a clamp head, clamp or clamp and packer combination which is not suitable for the job in hand.

EP 1946891 is an earlier application belonging to the present applicant and discloses a clamp head having an arched body and opposing unequal length arms. The arms define a reaction arm having a curved reaction face and a clamping arm having a curved clamping face. The curve of the reaction face has a constant radius, and the reaction face is further provided with ribs extending fully across its width. EP 0431209 discloses a clamp head configured for use with profile rail. The reaction arm of the clamp head is provided with a lip on either side of the reaction face. The lips cooperate to locate the clamp head on the profile rail and to prevent rotation of the clamp head relative to the profile rail. DE 2816295 discloses a machine tool clamp having a reaction arm that is significantly longer than the clamping arm. This clamp is susceptible to weakening or cracking of the reaction arm at elevated loads.

SUMMARY OF THE INVENTION

According to a first aspect of the present invention there is provided a clamp head comprising an arched body having upper and lower faces, and opposing unequal length arms, the body further having a through aperture for a bolt or like threaded fastener extending between the upper and lower faces, the aperture in the upper face being generally oval and tapering outwardly through the body in the direction of the lower face, wherein the arms comprise a reaction arm having at its distal end a curved reaction face extending across the entire width of the reaction arm and a clamping arm having at its distal end a curved clamping face, the curved reaction face have a first edge that is proximal to the clamping face and a second edge that is distal to the clamping face, wherein the radius of curvature of the reaction face increases in the direction of the second edge, wherein further the through aperture intersects the reaction face.

The reaction face, in use, rests against a reaction surface, while the clamping face rests against a clamping surface. The intersection of the through aperture with the reaction face provides a cut out in the first edge of the reaction face which accommodates the shank of a fastener when the clamp head is positioned such that it is resting at or near the second edge of the reaction face. Such positioning occurs when the vertical separation between the level of the clamping surface and the reaction surface is at to near the maximum obtainable by the clamp head.

The through aperture of the clamp head may further intersect the clamping face. The intersection of the through aperture with the clamping face provides a cut out in an edge of the clamping face that is proximal to the reaction face. The clamping face cut out accommodates the shank of a fastener when the clamp head is positioned such that it is resting at or near the first edge of the reaction face. Such positioning occurs when the vertical separation between the level of the clamping surface and the reaction surface is at to near the minimum obtainable by the clamp head.

By providing the reaction arm with a curved reaction face having an increased radius in the direction of the second edge, it will be appreciated that with increasing clamp angle, i.e. as the clamp pivots about the reaction face to accommodate increasing vertical separation between the level of the clamping surface and the reaction surface, the contact point on the reaction face moves further away from the line of action of a fastener extending through the clamp head.

In a preferred embodiment, the reaction arm is longer than the clamping arm. The clamping arm may preferably narrow in the direction of the distal end of the clamping arm.

The clamping face of the clamping arm is preferably provided with one or more formations which, in use, frictionally engage a clamping surface against which the clamping face rests. The formations of the clamping arm may extend in a direction substantially parallel to a longitudinal axis of the clamp head. The formations of the clamping arm may, for example, comprise a plurality of teeth, interruptions, abutments, raised facets, crowns or the like which are spaced across the clamping face of the clamping arm. The formations additionally prevent rotation of the clamp head, in use.

The upper surface of the body is provided with an aperture that extends through the body to the lower surface. The upper face of the body may be provided with a recess configured to receive an insert, wherein further the through aperture extends through the body from a lower region of the recess. The recess may have substantially parallel sides and a curved base, the recess being adapted to receive a complementarily shaped insert having substantially parallel sides, a curved base and a through aperture, wherein the insert is pivotable within the recess. The insert and recess cooperate to align a threaded fastener extending through the clamp head at differing inclination angles, in use, of the clamp head.

According to a second aspect of the present invention there is provided a clamp arrangement including a clamp head according to the first aspect, the clamp arrangement having an elongate threaded fastener such as a nut and bolt extending through the through aperture of the clamp head.

The nut and bolt may be a conventional nut and bolt where one of the nut and the bolt head is held against rotation and the other of the nut and bolt head is rotated until a predetermined torque has been applied, for example by a torque wrench or driver.

Alternatively, the bolt may be of the shearing type wherein in the distal end of the bolt shank is configured to break from the remainder of the bolt shank when a predetermined tensile force is reached within the bolt shank. In such an arrangement the distal end of the shank may be shaped such that it can be held against rotation by an appropriately shaped driver which is able to simultaneously rotate the nut until the desired tensile force is reached.

According to a further aspect of the present invention there is provided a clamp arrangement including a clamp head having a body, a clamping face, a reaction face and a through aperture, the clamp arrangement having an elongate threaded fastener extending through the through aperture of the clamp head, the threaded fastener including a nut and a bolt of the shearing type wherein, in use, in the distal end of the bolt shank is configured to break from the remainder of the bolt shank when a predetermined tensile force is reached within the bolt shank.

BRIEF DESCRIPTION OF DRAWINGS

An embodiment of the present invention will now be described with reference to the accompanying drawings in which.

DETAILED DESCRIPTION OF THE PRESENTLY PREFERRED EMBODIMENTS

Referring to the figures there is shown a clamp head generally designated 10. The clamp head 10 is of a unitary construction comprising a shaped body 12. The body 12 is preferably manufactured from metal and is formed by a casting or forging method. As can be seen from the side views, the body 12 has a generally arched shape having two arms 14,16 of unequal length. The longer arm 14 may be termed the reaction arm and has a distal end 18. The shorter arm 16 may be termed the clamping arm and has a distal end 20. The basis for this terminology is described in greater detail below. The body 12 may further be considered to have an upper side or face 22 and a lower side or face 24.

Figure 1:
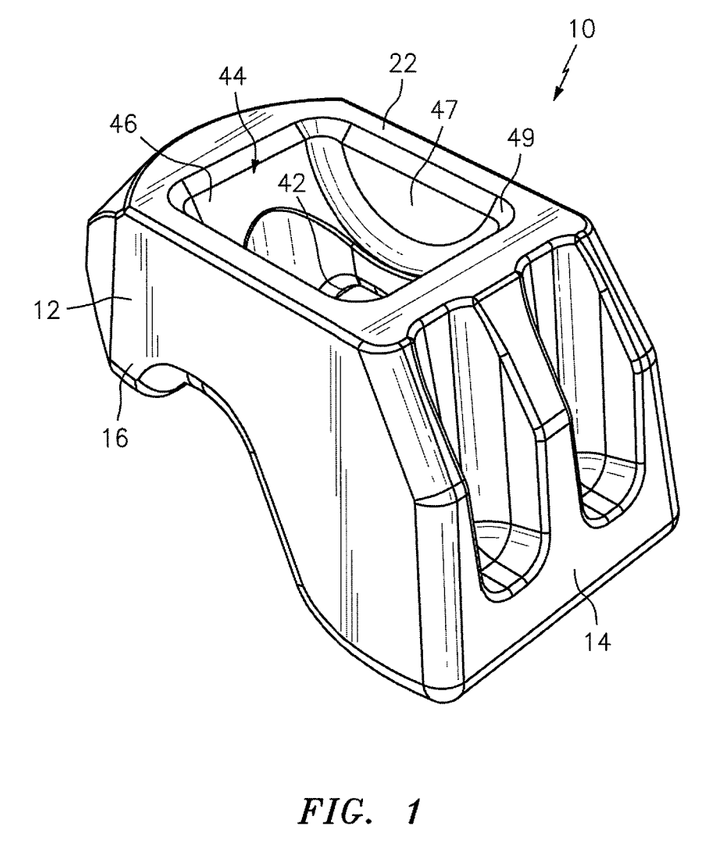
FIG. 1 shows a perspective view from above and to one side of a clamp head according to the present invention.
Figure 2:
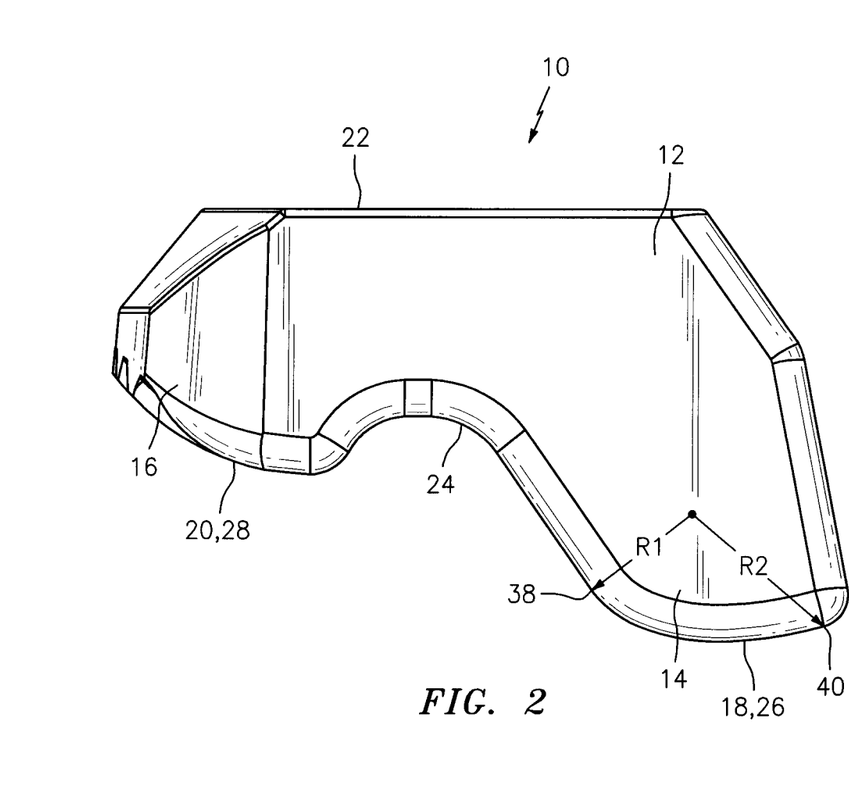
FIG. 2 shows a side view of the clamp head.

The distal end 18 of the reaction arm 14 is rounded and defines a reaction face 26. The reaction face 26 extends between a first edge 38 which is proximal to the clamping arm 16 and a second edge 40 which is distal to the clamping arm 16. As can be seen illustrated on FIG. 2, the curve of the reaction face 26 at the first edge 38 has a first radius R1 and the curve of the reaction face 26 at the second edge 40 has a radius R2, where R2 is greater than R1. By providing the reaction arm 14 with a curved reaction face 26 having an increased radius in the direction of the second edge 40, it will be appreciated that with increasing clamp angle, i.e. as the clamp head 10 pivots about the reaction face 26 to accommodate increasing vertical separation between the level of the clamping surface and the reaction surface, the contact point on the reaction face 26 moves further away from the line of action of a fastener extending through the clamp head 10. The reaction face 26 is not provided with any formations such as, for example, teeth, interruptions, abutments, raised facets, crowns, grooves, lips, recesses or such like. The reaction face 26 is substantially smooth. It will however be understood that the reaction face 26 may be slightly textured as a result of the manner in which the clamp head 10 is manufactured. For example, in the event that the clamp head 10 is manufactured by a metal casting procedure, then the reaction face 26 may have a surface texture arising from the mould or casting sand. The reaction face 26 extends fully across the reaction arm 14 from one side to the other.

Figure 3:
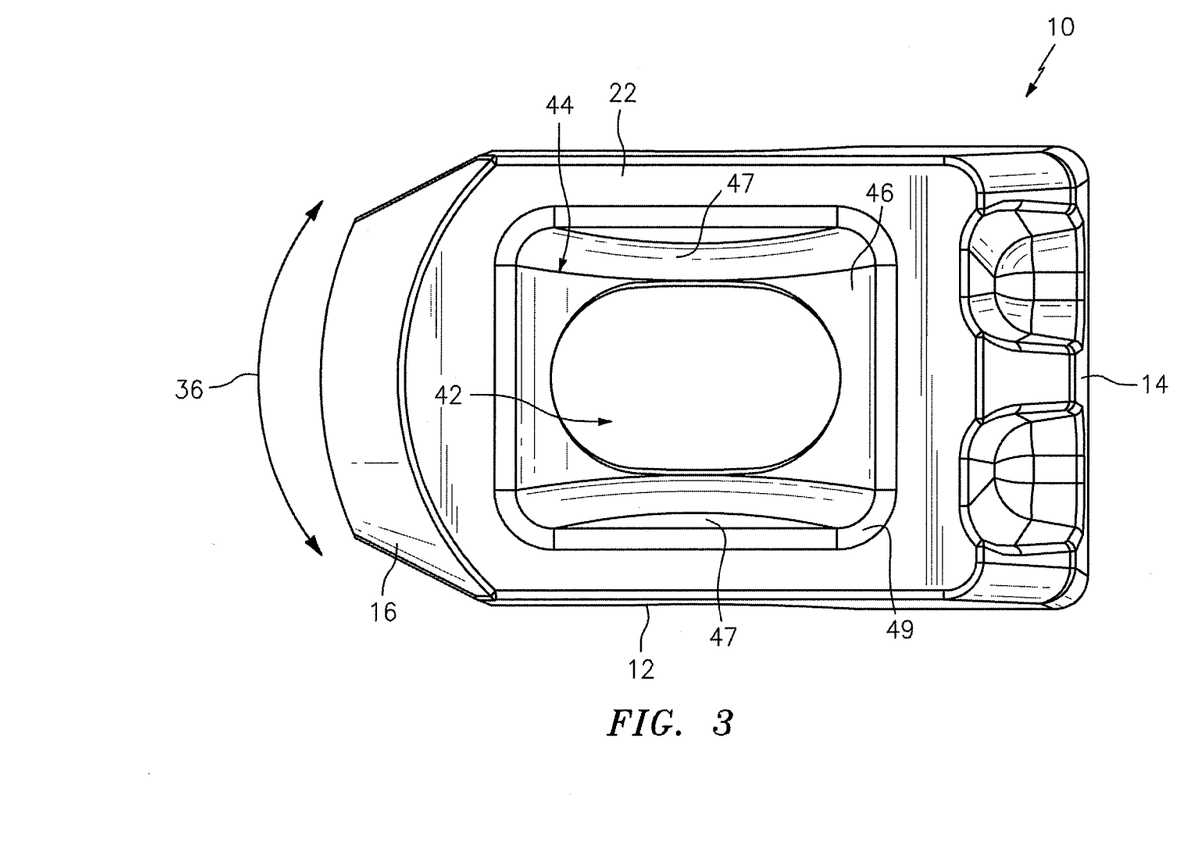
FIG. 3 shows a top plan view of the clamp head.
Figure 4:
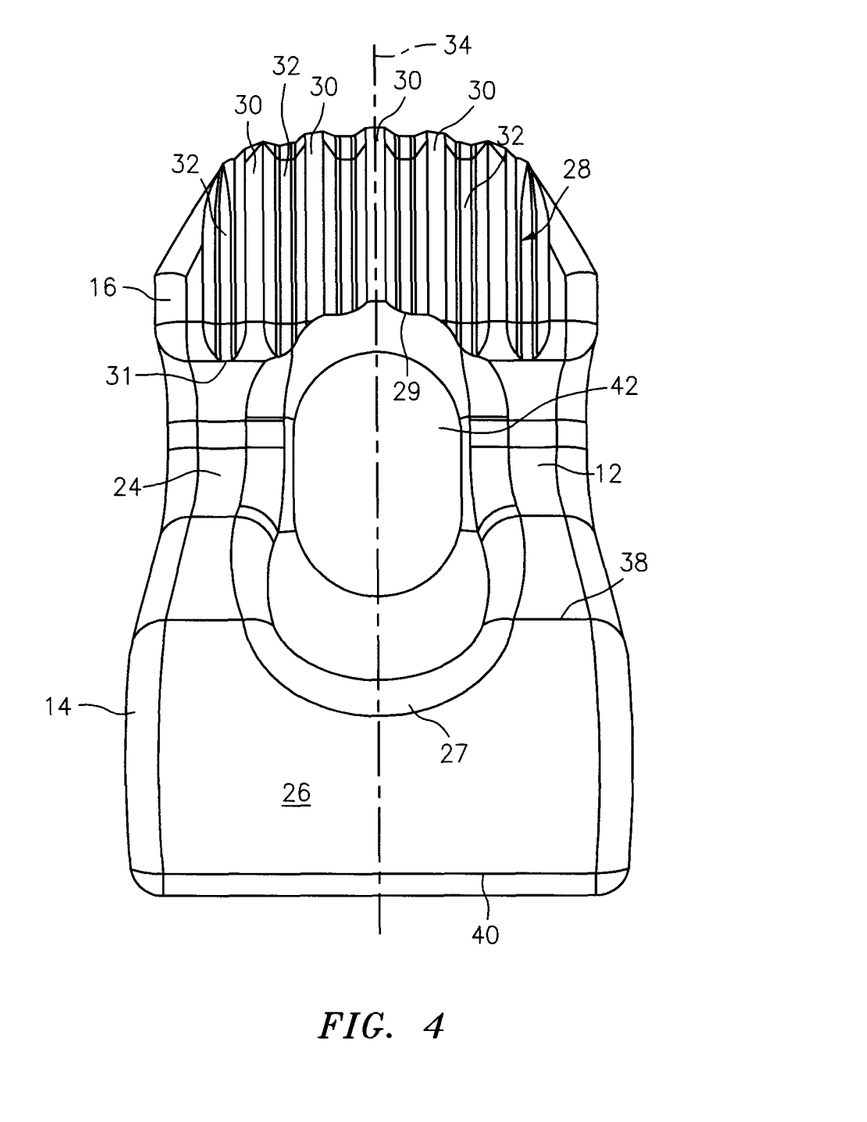
FIG. 4 is a bottom plan view of the clamp head.
Figure 5:
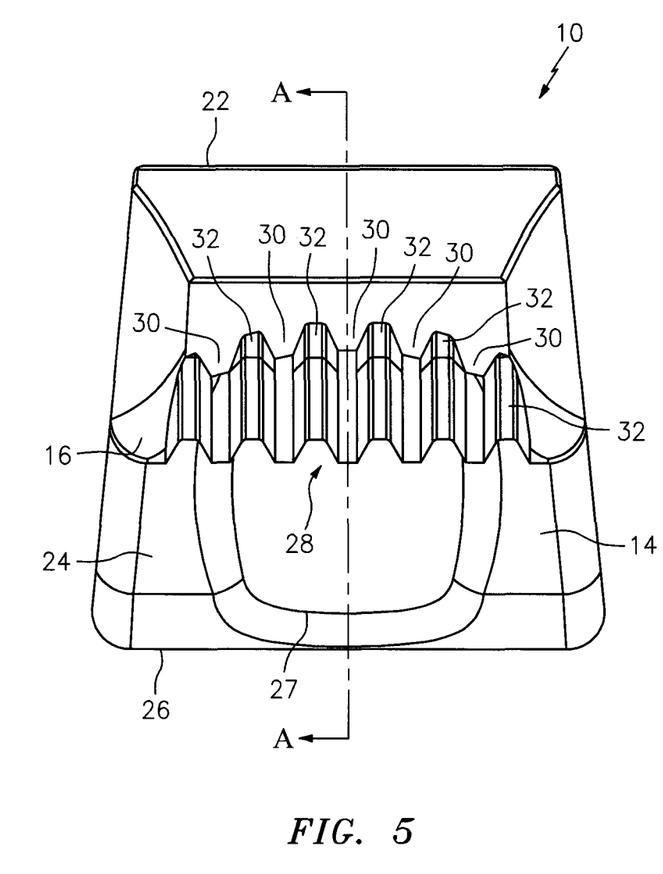
FIG. 5 is a front view of the clamp head.
Figure 6:
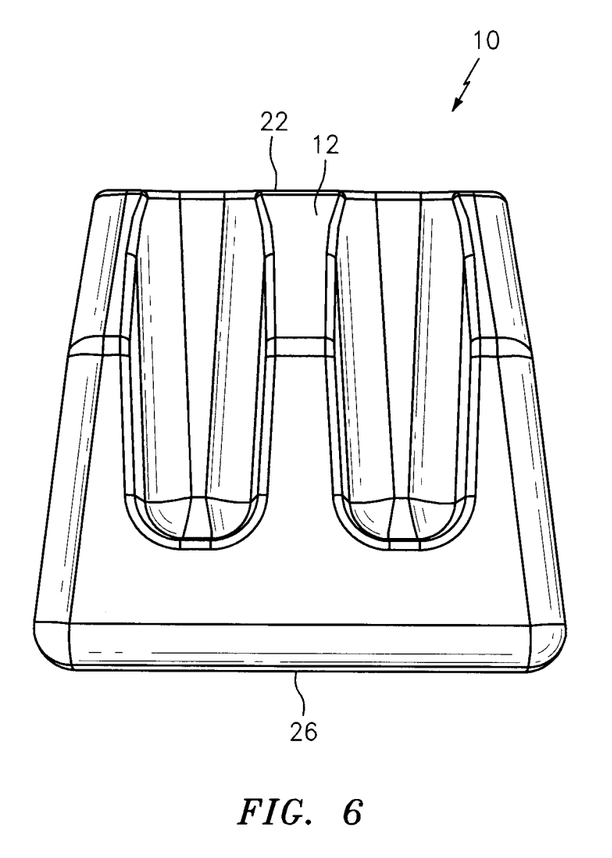
FIG. 6 is a rear view of the clamp head.
Figure 7:
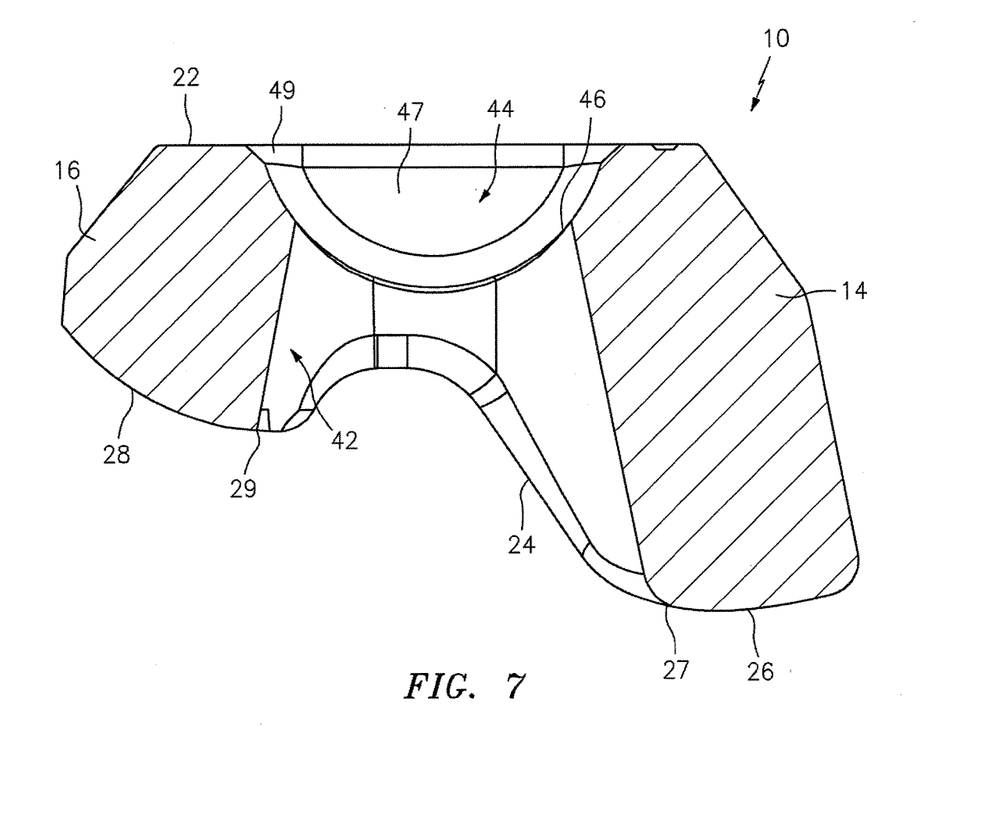
FIG. 7 is a cross-sectional view of the clamp head as indicated by arrows A-A of FIG. 5.

The distal end 20 of the clamping arm 16 is also rounded and defines a clamping face 28. The clamping face 28 and provided with a plurality of teeth 30. The teeth 30 are interspersed by spaces 32. The teeth 30 and spaces 32 are aligned with the longitudinal axis 34 of the body 12. The crown surfaces of the teeth 30 may be considered to constitute portions of the clamping face 28 of the clamp 10 as, in use, the crown surfaces rest against a clamping surface. The teeth 30 additionally, in use, resist rotation of the clamp head 10 as indicated by arrow 36 of FIG. 3 by frictionally engaging the clamping surface against which the clamping face 28 rests, in use. The clamping arm 16 narrows in the direction away from the reaction arm 14.

The body 12 is further provided with a through aperture 42 which extends through the body 12 between the upper and lower sides 22,24. As can be seen from the cross-sectional views, the aperture 42 tapers outwardly in the direction of the lower side 24 of the body 12. The aperture 42 is not circular, but instead is oval. The upper side 22 of the body 12 is further provided with a recess 44. The recess 44 is provided with a curved base 46 and substantially flat side walls 47. The side walls 47 are tapered inwardly to a slight degree in the direction of the curved base 46 of the recess 44. This tapering provides a moulding taper for the recess 44 which allows the body 12 to be produced by a metal casting operation. The recess 44 is surrounded by a chamfer 49 the function of which is described in greater detail below.

The through aperture 42 extends down the reaction arm 14 such that the aperture 42 intersects the reaction face 26. The through 42 aperture intersects the reaction face 26 such that a cut out 27 is provided in the first edge 38 of the reaction face 26. The cut out 27, in use, accommodates the shank of a fastener when the clamp head 10 is positioned such that it is resting at or near the second edge 40 of the reaction face 26. Such positioning occurs when the vertical separation between the level of the clamping surface and the reaction surface is at to near the maximum obtainable by the clamp head 10.

The through aperture 42 further extends down the clamping arm 16 such that the aperture 42 intersects the clamping face 28. The through aperture 42 intersects the clamping face 28 such that a further cut out 29 is provided in an edge 31 of the clamping face 28 that is proximal to the reaction arm 14. The further cut out 29, in use, accommodates the shank of a fastener when the clamp head 10 is positioned such that it is resting at or near the first edge 38 of the reaction face 26. Such positioning occurs when the vertical separation between the level of the clamping surface and the reaction surface is at to near the minimum obtainable by the clamp head 10.

Figure 8:
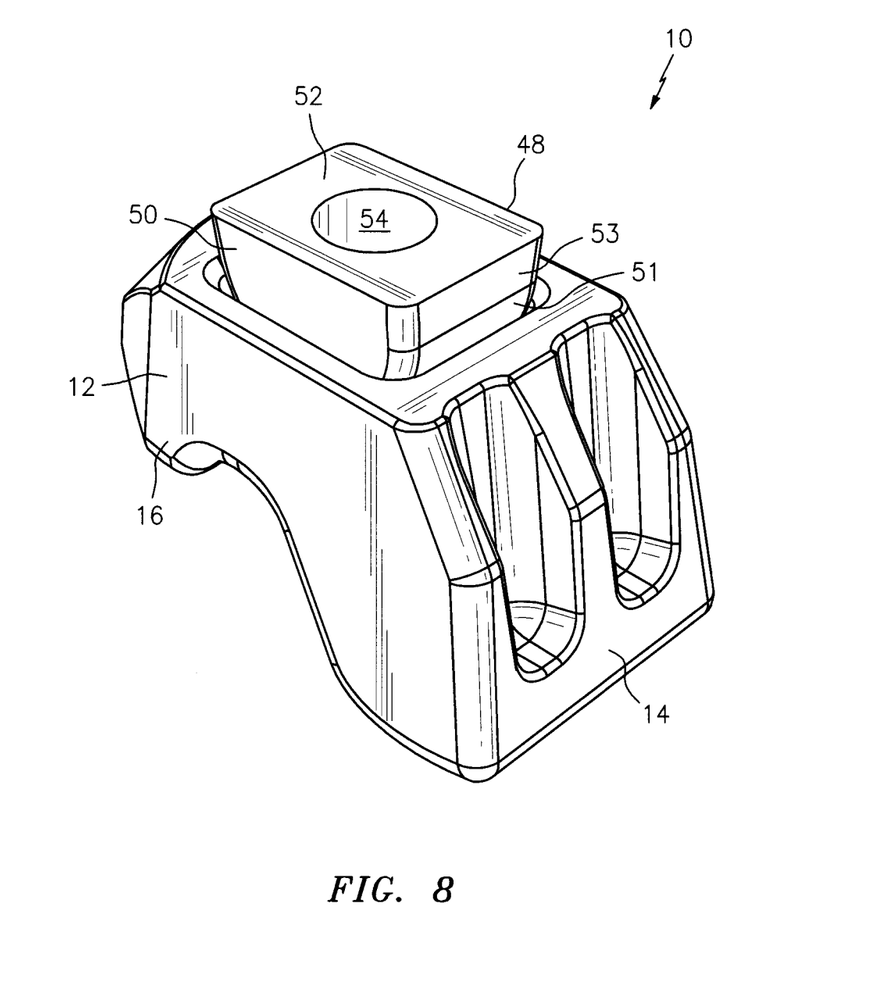
FIG. 8 is a perspective view from above and to one side of the clamp head and a pivotable insert.
Figure 9:
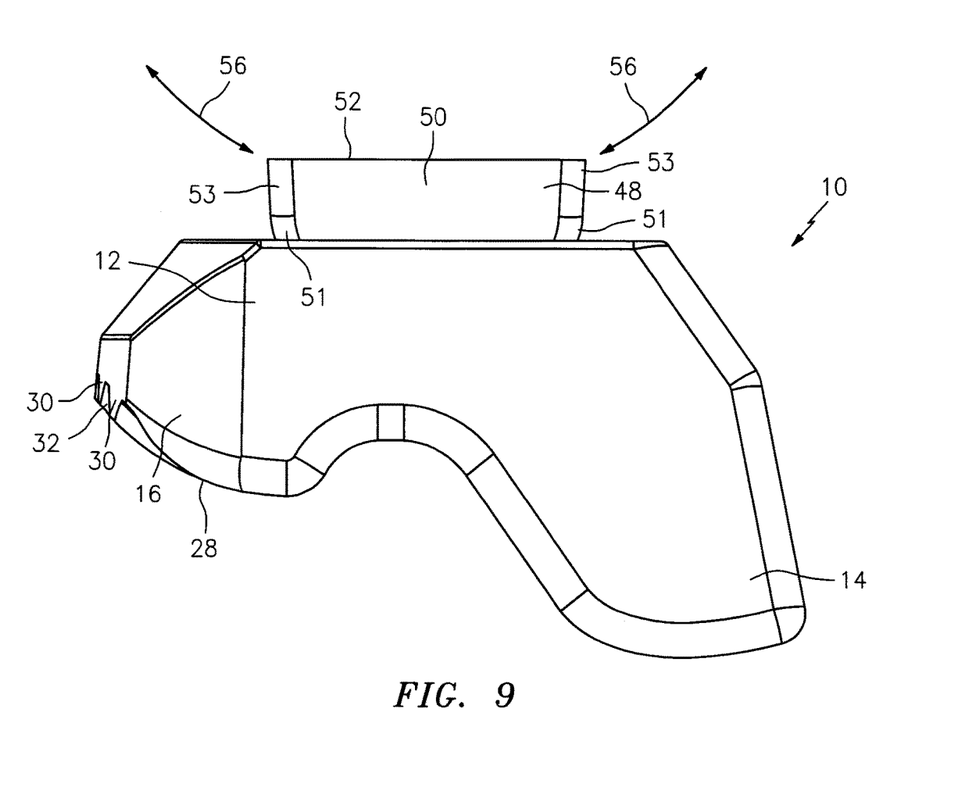
FIG. 9 shows a side view of the clamp head and insert of FIG. 8.

The through aperture 24 extends through the body 12 from the curved base 46 of the recess 44. In use, and as can be seen in FIGS. 8 and 9, the recess 44 receives a complementarily shaped insert 48. The insert 48 is also provided with a curved base 51 and substantially flat side walls 50. The insert 48 is further provided with a substantially flat top surface 52 and a substantially circular through aperture 54. In a similar manner to the side walls 48 of the recess 44, the side walls 50 of the insert 48 taper from the flat top surface 52. As before, the tapering of the side walls 50 provides a moulding taper and allows the insert 48 to be produced by a metal casting operation. The portions 53 of the curved base 51 which are adjacent the flat top surface 52 of the insert are substantially flat and as such are not continuations of the curve of the base 51.

In use, the insert 48 is able to "rock" or pivot relative to the clamp head 10 as indicated by arrow 56, and a threaded fastener extends through both aligned apertures 42,54. The provision of the chamfer 49 around the recess 44 and the substantially flat portions 53 on the curved base 51 of the insert 48 cooperate so as to ensure that insert 48 does not jam in the recess 44 at extreme pivot angles. It will further be appreciated that the recess 44 and insert 48 are complementarily dimensioned so as to have sufficient sideways clearance to avoid jamming as the insert 48 tilts and articulates, in use.

It will be appreciated that the provision the recess 44 and insert 48 are optional, and that in an alternative configuration the upper side 22 of the body 12 may be configured such that a threaded fastener extending through the aperture 42 bears directly against the body 12.

In use, the threaded fastener may be a conventional nut and bolt where one of the nut and the bolt head is held against rotation and the other of the nut and bolt head is rotated until a predetermined torque has been applied, for example by a torque wrench or driver. Alternatively, the bolt may be of the shearing type wherein in the distal end of the bolt shank is configured to break from the remainder of the bolt shank when a predetermined tensile force is reached within the bolt shank. In such an arrangement the distal end of the shank may be shaped such that it can be held against rotation by an appropriately shaped driver which is able to simultaneously rotate the nut until the desired tensile force is reached. Such a shearing type bolt is produced and marketed by Tension Controlled Bolts Ltd under the TCB brand.

The invention claimed is:

1. A clamp head comprising an arched body having upper and lower faces, and opposing unequal length arms, the body further having a through aperture for a bolt or like threaded fastener extending between the upper and lower faces, the through aperture tapering outwardly through the body in a direction of the lower face, wherein the arms comprise a reaction arm, the reaction arm having a curved reaction face at a distal end extending across an entire width of the reaction arm and a clamping arm, the clamping arm having a curved clamping face at a distal end, the curved reaction face has a first edge that is proximal to the clamping face and a second edge that is distal to the clamping face, wherein a radius of curvature of the reaction face increases in a direction of the second edge, wherein the upper face of the body is provided with a recess configured to receive an insert, wherein the through aperture extends through the body from a lower region of the recess, wherein the through aperture further intersects the reaction face and the clamping face.

2. The clamp head as claimed in claim 1, wherein the reaction arm is longer than the clamping arm.

3. The clamp head as claimed in claim 1, wherein the clamping arm narrows in a direction of the distal end of the clamping arm.

4. The clamp head as claimed in claim 1, wherein the clamping face of the clamping arm is provided with one or more formations which, in use, frictionally engage a clamping surface against which the clamping face rests.

5. The clamp head as claimed in claim 4, wherein the formations of the clamping arm extend in a direction substantially parallel to a longitudinal axis of the clamp head.

6. The clamp head as claimed in claim 4, wherein the formations of the clamping arm comprise a plurality of teeth, interruptions, abutments, raised facets or crowns which are spaced across the clamping face of the clamping arm.

7. The clamp head as claimed in claim 1, wherein the recess has substantially parallel sides and a curved base, the recess being adapted to receive a complementarily shaped insert having substantially parallel sides, a curved base and a through aperture, wherein the insert is pivotable within the recess.

8. The clamp head as claimed in claim 1, wherein the reaction face is free from formations which, in use, frictionally engage a reaction surface against which the reaction face rests.

9. The clamp head as claimed in claim 1 further including an elongate threaded fastener extending through the through aperture of the clamp head.

10. The clamp head as claimed in claim 9, wherein the threaded fastener is a conventionally configured nut and bolt where, in use, a head of one of the nut and the bolt is held against rotation and a head of the other of the nut and bolt is rotated until a predetermined torque has been applied.

11. The clamp head as claimed in claim 9, wherein the threaded fastener includes a nut and a bolt of the shearing type wherein, in use, a distal end of a shank of the bolt is configured to break from a remainder of the bolt shank when a predetermined tensile force is reached within the bolt shank.

12. A clamp head comprising an arched body having upper and lower faces, and opposing unequal length arms, the body further having a through aperture for a bolt or like threaded fastener extending between the upper and lower faces, the through aperture tapering outwardly through the body in a direction of the lower face, wherein the arms comprise a reaction arm, the reaction arm having a curved reaction face at a distal end extending across an entire width of the reaction arm and a clamping arm, the clamping arm having a curved clamping face at a distal end, the reaction arm being longer than the clamping arm, the curved reaction face has a first edge that is proximal to the clamping face and a second edge that is distal to the clamping face, wherein a radius of curvature of the reaction face increases in a direction of the second edge, wherein the upper face of the body is provided with a recess configured to receive an insert, wherein the through aperture extends through the body from a lower region of the recess, wherein the through aperture further intersects the reaction face and the clamping face.

13. The clamp head as claimed in claim 12, wherein the recess has substantially parallel sides and a curved base, the recess being adapted to receive a complementarily shaped insert having substantially parallel sides, a curved base and a through aperture, wherein the insert is pivotable within the recess.

14. The clamp head as claimed in claim 13, wherein the clamping arm narrows in a direction of the distal end of the clamping arm.

15. The clamp head as claimed in 13, wherein the clamping face of the clamping arm is provided with one or more formations which, in use, frictionally engage a clamping surface against which the clamping face rests.

16. The clamp head as claimed in claim 15, wherein the formations of the clamping arm extend in a direction substantially parallel to a longitudinal axis of the clamp head.

17. The clamp head as claimed in claim 16, wherein the formations of the clamping arm comprise a plurality of teeth, interruptions, abutments, raised facets or crowns which are spaced across the clamping face of the clamping arm.

18. The clamp head as claimed in claim 13, wherein the reaction face is free from formations which, in use, fictionally engage a reaction surface against which the reaction face rests.

\* \* \* \* \*